(12) United States Patent
Jia et al.

(10) Patent No.: US 10,679,007 B2
(45) Date of Patent: Jun. 9, 2020

(54) METHOD AND SYSTEM FOR PATTERN DISCOVERY AND REAL-TIME ANOMALY DETECTION BASED ON KNOWLEDGE GRAPH

(71) Applicant: Intelligent Fusion Technology, Inc, Germantown, MD (US)

(72) Inventors: Bin Jia, Germantown, MD (US); Cailing Dong, Germantown, MD (US); Zhijiang Chen, Germantown, MD (US); Kuo-Chu Chang, Fairfax, VA (US); Nichole Sullivan, Germantown, MD (US); Genshe Chen, Germantown, MD (US)

(73) Assignee: INTELLIGENT FUSION TECHNOLOGY, INC., Germantown, MD (US)

( * ) Notice: Subject to any disclaimer, the term of this patent is extended or adjusted under 35 U.S.C. 154(b) by 67 days.

(21) Appl. No.: 16/117,964

(22) Filed: Aug. 30, 2018

(65) Prior Publication Data
US 2020/0073932 A1    Mar. 5, 2020

(51) Int. Cl.
*G06F 40/00*    (2020.01)
*G06F 40/295*    (2020.01)
*G06N 5/04*    (2006.01)
*G06F 16/28*    (2019.01)
*G06F 40/30*    (2020.01)
*G06F 40/253*    (2020.01)
*G06F 40/268*    (2020.01)

(52) U.S. Cl.
CPC .......... *G06F 40/295* (2020.01); *G06F 16/288* (2019.01); *G06F 40/253* (2020.01); *G06F 40/30* (2020.01); *G06N 5/047* (2013.01); *G06F 40/268* (2020.01)

(58) Field of Classification Search
CPC combination set(s) only.
See application file for complete search history.

*Primary Examiner* — Vu B Hang
(74) *Attorney, Agent, or Firm* — Anova Law Group, PLLC

(57) ABSTRACT

A method for pattern discovery and real-time anomaly detection based on knowledge graph, comprising: based on a dataset including messages collected within a certain period, constructing a local knowledge graph (KG); applying a statistical relational learning (SRL) model to predict hidden relations between entities to obtain an updated local KG; from all SPO triples of the updated local KG, discovering a normalcy pattern that includes frequent entities, frequent relations, and frequent SPO triples; and in response to receiving streaming data from a message bus, extracting a plurality of entities, a plurality of relations, and a plurality of SPO triples, from the streaming data for comparison with the normalcy pattern using semantic distance, thereby determining whether there is an abnormal entity, relation, or SPO triple in the streaming data.

20 Claims, 11 Drawing Sheets

US 10,679,007 B2

METHOD AND SYSTEM FOR PATTERN DISCOVERY AND REAL-TIME ANOMALY DETECTION BASED ON KNOWLEDGE GRAPH

GOVERNMENT RIGHTS

This invention was made partly with Government support under Contract FA8750-17-C-0224, awarded by the United States Air Force Research Laboratory. The U.S. Government has certain rights in this invention.

FIELD OF THE DISCLOSURE

The disclosure generally relates to the field of data processing and, more particularly, to a method and a system for pattern discovery and real-time anomaly detection based on knowledge graph (KG).

BACKGROUND

Multiple intelligence (Multi-INT) fusion refers to the fusion of data from multiple sources into one relatively complete picture, which helps to detect, locate, and track objects or activities. Major types of data includes unstructured data coming from open sources like Tweets, and structured data collected by sensors such as a video camera, radar, and infrared sensor.

Pattern discovery and anomaly detection are critical processes in Multi-INT fusion for situation assessment and surveillance. To extract patterns from the structured data, conventional machine learning algorithms or data mining techniques may be applied. For example, a conventional machine learning algorithm may use the structured data to learn the mapping from sensor input to output patterns. Based on the mapping, abnormal patterns may be identified, so as to identity abnormal activities.

However, for unstructured data received from open sources, such as real-time tweets, it is often difficult to apply the conventional learning algorithm to extract patterns and to further identify abnormal activities based on the extracted patterns. Thus, a method and a system for extracting patterns from unstructured data is desired.

The disclosed method and system for pattern discovery and real-time anomaly detection based on knowledge graph are directed to solving one or more problems set forth above and other problems in the art.

BRIEF SUMMARY OF THE DISCLOSURE

One aspect of the present disclosure provides a method for pattern discovery and real-time anomaly detection based on knowledge graph, comprising: based on a dataset including messages collected within a certain period, constructing a local knowledge graph (KG), wherein the local KG includes a plurality of nodes for denoting a plurality of entities and a plurality of edges for denoting a plurality of relations, an entity is a subject or an object, and a relation is a predicate that couples a subject to an object to form a subject-predicate-object (SPO) triple; applying a statistical relational learning (SRL) model to predict hidden relations between entities to obtain an updated local KG; from all SPO triples of the updated local KG, discovering a normalcy pattern that includes frequent entities, frequent relations, and frequent SPO triples; in response to receiving an input document, extracting a plurality of entities, a plurality of relations, and a plurality of SPO triples from the input document to determine whether there is an abnormal word, thereby detecting an abnormal entity, relation, or SPO triple in the input document; and in response to receiving streaming data from a message bus, extracting a plurality of entities, a plurality of relations, and a plurality of SPO triples, from the streaming data for comparison with the normalcy pattern using semantic distance, thereby determining whether there is an abnormal entity, relation, or SPO triple in the streaming data. The updated local KG is stored in an open-source distributed data management system and is visualized using a JavaScript library through a web browser.

Another aspect of the present disclosure provides a system for pattern discovery and real-time anomaly detection based on knowledge graph, comprising: one or more processors and a memory storing programs. When executed by the one or more processors, the programs perform of method of: based on a dataset including messages collected within a certain period, constructing a local knowledge graph (KG), wherein the local KG includes a plurality of nodes for denoting a plurality of entities and a plurality of edges for denoting a plurality of relations, an entity is a subject or an object, and a relation is a predicate that couples a subject to an object to form a subject-predicate-object (SPO) triple; applying a statistical relational learning (SRL) model to predict hidden relations between entities to obtain an updated local KG; from all SPO triples of the updated local KG, discovering a normalcy pattern that includes frequent entities, frequent relations, and frequent SPO triples; in response to receiving an input document, extracting a plurality of entities, a plurality of relations, and a plurality of SPO triples from the input document to determine whether there is an abnormal word, thereby detecting an abnormal entity, relation, or SPO triple in the input document; and in response to receiving streaming data from a message bus, extracting a plurality of entities, a plurality of relations, and a plurality of SPO triples, from the streaming data for comparison with the normalcy pattern using semantic distance, thereby determining whether there is an abnormal entity, relation, or SPO triple in the streaming data. The updated local KG is stored in an open-source distributed data management system and is visualized using a JavaScript library through a web browser.

Other aspects of the present disclosure can be understood by those skilled in the art in light of the detailed descriptions, appended claims, and accompanying drawings of the present disclosure.

BRIEF DESCRIPTION OF THE DRAWINGS

Various objectives, features, and advantages of the present disclosure can be more fully understood with reference to the detailed descriptions of the following drawings accompanying the present disclosure. Like reference numerals refer to like elements. It shall be noted that the following drawings are merely examples for illustrative purposes according to various disclosed embodiments and are not intended to limit the scope of the present disclosure.

DETAILED DESCRIPTION

Figure 1:
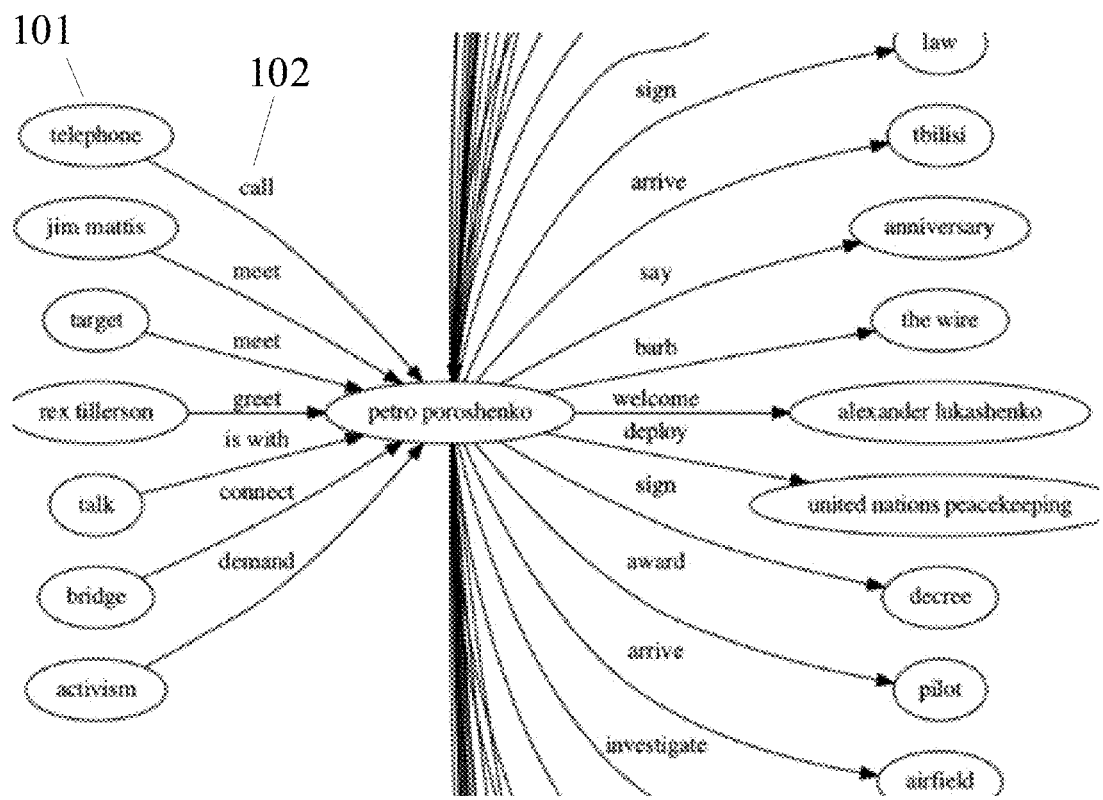
FIG. 1 illustrates an existing partial knowledge graph.

Reference will now be made in detail to exemplary embodiments of the invention, which are illustrated in the accompanying drawings. Wherever possible, the same reference numbers will be used throughout the drawings to refer to the same or like parts. Obviously, the described embodiments are some but not all of the embodiments of the present disclosure. Based on the disclosed embodiments, those ordinarily skilled in the relevant art may derive other embodiments consistent with the present disclosure, all of which are within the scope of the present disclosure.

Further, in the present disclosure, the disclosed embodiments and the features of the disclosed embodiments may be combined or separated under conditions without conflicts. In various embodiments, the terms "first" and "second", etc., may be used to distinguish one element from another element, and the singular forms "a", "an", and "the" are intended to include the plural forms, unless the context clearly indicates otherwise.

The present disclosure provides a method for pattern discovery and real-time anomaly detection based on knowledge graph (KG). According to the present disclosure, a local KG may be constructed using data extracted within a certain period of time from unstructured data sources. Based on the constructed local KG, hidden relations between entities may be found via a link prediction algorithm (e.g., RESCAL), to update the local KG. An entity herein may refer to a concrete object or an abstract concept. For example, an entity may be a person, a place, a technique, or an event.

Further, based on the local KG, a normalcy pattern including frequent entities, frequent relations, and frequent SPO triples may be discovered, and when fed with unstructured data arriving in a streaming fashion, e.g., real-time tweets, the normalcy pattern may detect an anomaly from the real-time tweets. The anomaly herein may, for example, refer to an abnormal entity or an abnormal SPO that delivers abnormal information.

Correspondingly, the present disclosure provides a system for pattern discovery and real-time anomaly detection based on KG. The disclosed system may include a computing device, such as a desktop computer, a notebook, a mobile phone, or other portable electronic devices. The computing device may include, for example, one or more processors, and a memory. A processor may be, for example, a microcontroller, and the memory may store an operating system, one or more application programs, and program data. The program data may be instructions that, when executed by the one or more processors, implement the aforementioned method, which is described in greater detail later in this specification.

A knowledge graph (KG) may be referred to as a graph structured knowledge base (KB), which is configured to store and deliver information in form of relations between the entities. Among two primary assumptions of the KG, the Closed World Assumption (CWA) assumes any relation not presented in the KG to be false, while the Open World Assumption (OWA) interprets any relation that is not presented by in the KG as unknown. Take into consideration the fact that a KG can be quite sparse and incomplete, the OWA assumption is used in the present disclosure to construct the local KG. Further, the local KG may be a domain-specific knowledge graph that is related to a specific topic, such as a knowledge graph about "Ukraine".

Further, entities may be displayed in a KG as nodes using entity names or entity identifiers, where an entity identifier may be, for example, a number or a string. Relations may be displayed in the KG as edges identified by actions. That is, a KG may include a plurality of nodes and a plurality of relations, for delivering information in form of relations between the entities.

Table 1 provides existing KGs constructed by four well-known approaches. As listed in Table 1, a curated approach is applied to build KGs such as WordNet and UMLS, which are primarily realized by a group of experts through manual creation of triples. The curated approach provides reliable data and achieves relatively high accuracy. A collaborative approach is applied to develop KGs such as Wikidata and Freebase, in which, triples are manually generated by a group of volunteers. The collaborative approach generally provide reliable but incomplete data, with a relatively high accuracy ensured.

Further, an automated semi-structured approach is applied to build KGs such as YAGO, DBPedia, and Freebase, in which, triples are extracted automatically from semi-structured text such as infoboxes in Wikipedia, via hand-crafted rules or learned rules, etc. The automated semi-structured approach produces highly accurate but relatively incomplete data. Further, an automated unstructured approach is applied to establish KGs like NELL and DeepDive, in which, triples are automatically extracted from unstructured data, such as text of webpages, through a natural language processing or machine learning technique. The automated unstructured approach produces highly accurate data, but the data may be incomplete.

TABLE I

KNOWLEDGE GRAPH CONSTRUCTION

| Approach | Triple Creation Methods | Typical Examples |
|---|---|---|
| Curated | Manually developed by a group of experts | WordNet, UMLS |
| Collaborative | Manually generated by a group of collaborative volunteers | Wikidata, Freebase |
| Automated Semi-Structured | Automatically extracted from semi-structured text via hand-crafted or learned rules | YAGO, DBPedia, Freebase |

TABLE I-continued

KNOWLEDGE GRAPH CONSTRUCTION

| Approach | Triple Creation Methods | Typical Examples |
|---|---|---|
| Automated Unstructured | Automatically extracted from unstructured text using natural language processing or machine learning techniques | NELL, DeepDive |

Based on one or more aforementioned existing KGs, some other large-scale KGs have been developed, such as the openly available KG developed by Google, i.e., Google knowledge graph (hereinafter referred to as "Google KG"). In some embodiments of the present disclosure, the existing KGs, such as Freebase, YAGO, and/or Google KG are applied to support the construction or update of a local KG.

Figure 10:
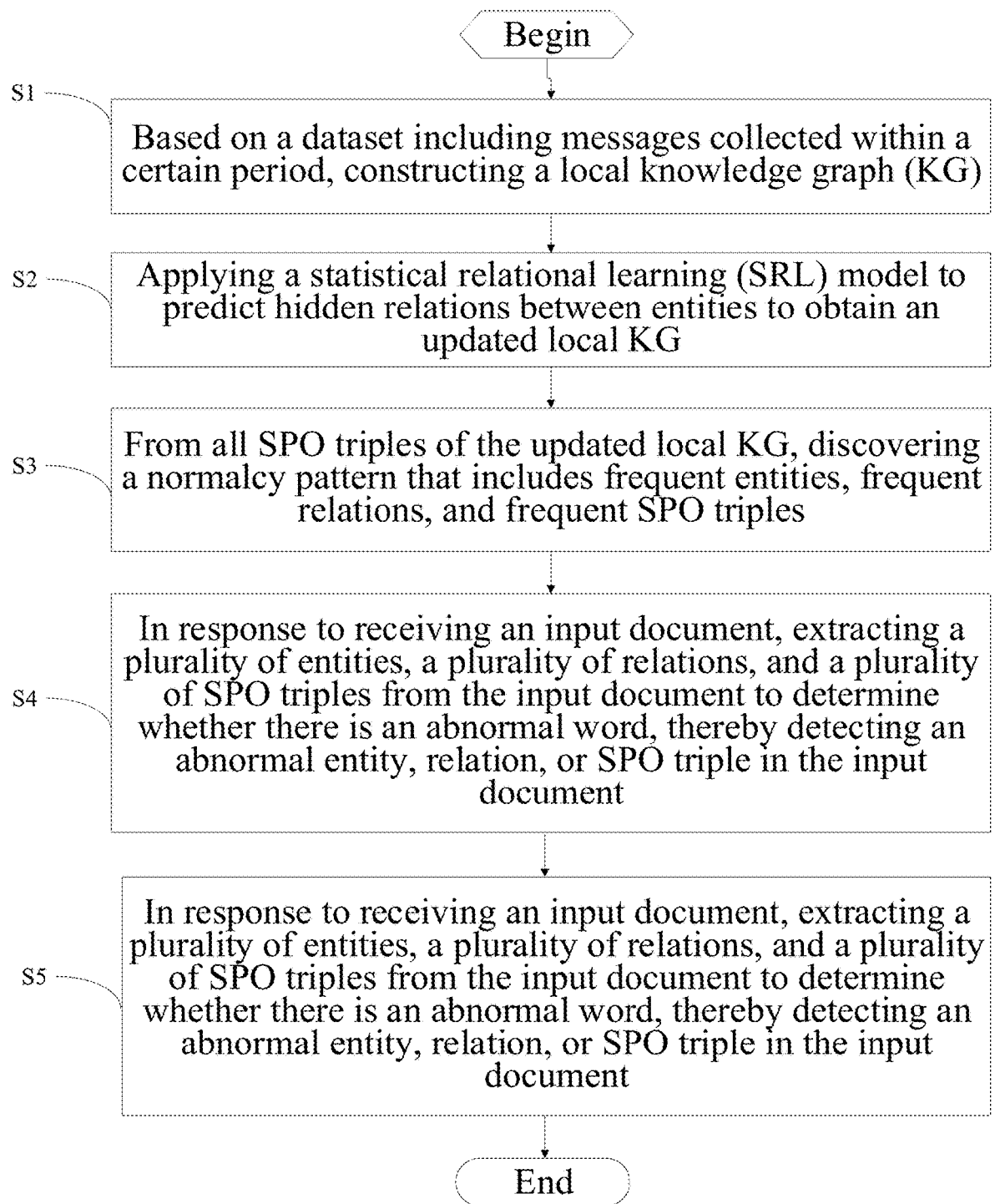
FIG. 10 illustrates a flow chart of a method for pattern discovery and real-time anomaly detection according to some embodiments of the present disclosure.

FIG. 10 illustrates a flow chart of a method for pattern discovery and real-time anomaly detection based on knowledge graph, according to some embodiments of the present disclosure. As shown in FIG. 10, the method for pattern discovery and real-time anomaly detection based on knowledge graph may include followings.

At S1: based on a dataset including unstructured data collected within a certain period, constructing a local knowledge graph (local KG). The unstructured data may be, for example, messages received from dynamic data sources such as Twitter API and Live Universal Awareness Map ("Liveuamap", a leading independent global news and information site). The certain period may be, for example, nine months, one year, or longer, and the present disclosure is not limited thereto.

The local KG may include a plurality of subject-predicate-object (SPO) triples, formed by a subject, an object, and a predicate that couples the subject to the object. The plurality of SPO triples may meet the standard of World Wide Web Consortium (W3C) Resource Description Framework (RDF). In a SPO triple of the local KG, the subject and the object are both entities and are denoted as nodes, and the predicate corresponds to the aforementioned relation and is denoted as an edge. The predicate (i.e., relation) may, for example, indicate an action that associates the subject and the object.

Figure 9:
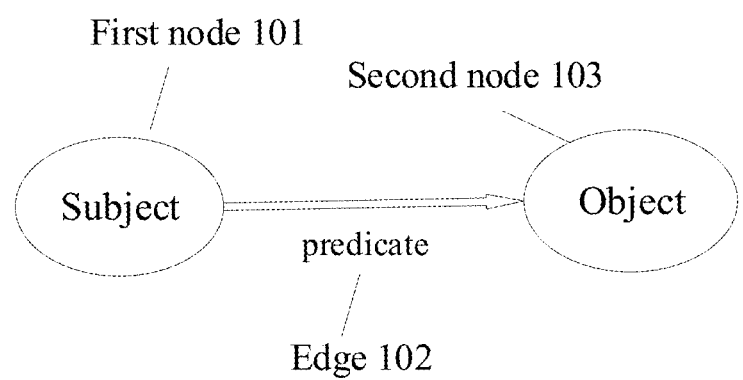
FIG. 9 illustrates a schematic view of an existing subject-predicate-object (SPO) triple.

FIG. 9 illustrates a schematic view of an existing subject-predicate-object (SPO) triple. As shown in FIG. 9, a SPO triple may include two nodes, i.e., a first node 101 and a second node 103, and an edge 102. The first node 101 may denote the subject, the second node 103 may denote the object, and the edge 102 may denote a predicate that characterizes a relation between the subject and the object. The edge 102 may include an arrow to differentiate the subject and the object connected by the predicate.

Further, there may be more than one edge 102 between the first node 101 and the second node 103. Optionally, each node may include one or more attributes, where an attribute includes data associated with the corresponding entity, such as a fact or a characteristic. Different SPO triples may be coupled to each other to eventually form a local KG.

In some embodiments, a large number of subject-predicate-object (SPO) triples may be extracted from unstructured and/or structured data to construct the local knowledge graph. For example, to construct a domain-specific knowledge graph, SPO triples may be extracted from a dataset of a specified topic or domain (e.g., Twitter messages related to Ukraine that are collected within the entire year of 2017).

In some embodiments, the based on a dataset including unstructured data collected within a certain period, constructing a local KG (S1) may further include: extracting entities from the messages collected with the certain period through a Named-Entity Recognition (NER) approach (S101); and extracting relations from sentences of the messages through an Open Information Extraction (Open IE) approach (S103).

More specifically, the extracting entities from the messages through a Named-Entity Recognition (NER) approach (S101) may include: given a message, extract text from the message; extracting entities from the text, sentence by sentence; locating and classifying the extracted entities into pre-defined categories, where pre-defined categories include location, date, time, person, ordinal, and name of organizations, etc.; and developing a NER label for each entity using a statistical model or a linguistic grammar-based algorithm.

For example, in the linguistic grammar-based algorithm, each sentence of the text can be pre-processed linguistically to produce coherent clauses, and the coherent clauses may undergo grammar analysis to produce NER labels. The statistical model may be, for example, a context sequence model, such as a Hidden Markov Model (HMM), Conditional Markov Model (CMM), or Conditional Random Fields (CRFs). Instead of predicting a NER label for a single entity, the context sequence model takes into consideration the context of the text and predict sequences of NER labels based on sequences of input entities. Accordingly, NER label may be accurately produced for each entity.

In practice, a CoreNLP natural language processing toolkit that includes the named entity recognizer may be applied to implement the NER approach. That is, the CoreNLP natural language processing toolkit may be employed to extract entities from texts. The CoreNLP natural language processing toolkit may be referred to hereinafter as the "CoreNLP toolkit", which is currently described at http://nlp.stanford.edu/software/corenlp.shtml.

Further, to identify and extract relations between entities (e.g., relation(s) between two people or relation(s) between a person and an organization), an Open IE package may be applied, where the Open IE package is a part of the aforementioned CoreNLP toolkit. The possibilities of existence of relations between entities may be considered, which is crucial for later-on anomaly detection.

More specifically, for each sentence of a text, the Open IE package may be used to identity two arguments, e.g., the subject and object, and a relation phrase linking the two argument. Under this situation, the subject and the object of the SPO triple may no longer be limited to entities discovered by the aforementioned NER approach and the predicate may represent any relation therebetween.

In one example, a Twitter dataset about Ukraine (Jan. 1, 2017 Sep. 30, 2017) may be collected from Liveuamap, and the Twitter dataset may include original tweet messages, retweeted messages, and embedded data. The embedded data may refer to data embedded in a message, such as photos, videos, or links. Further, the CoreNLP toolkit may be applied to extract entities from each message of the Twitter dataset. Further, the Open IE package embedded in the CoreNLP toolkit may be applied to extracts relations or SPO triples from each message of the Twitter dataset.

Because the Open IE approach tends to produce many redundant relations or SPOs, processes of relation reduction and entity resolution may be needed to improve the scalability and reliability of the local KG. That is, in some embodiments, the based on a dataset including unstructured data collected within a certain period, constructing a local KG (S1) may further include: applying a relation reduction algorithm to eliminate redundant relations (S105); and employing an openly available KG to perform entity resolution (S107).

In some embodiments, among a plurality of SPO triples that are similar to each other, a relation reduction algorithm based on part-of-speech (POS) tags of the entities in the SPO triples may be applied to identify a most concise SPO triple. Further, the relation between the subject and the object of the most concise SPO may be selected as a desired relation. Further, among the plurality of SPO triples that are similar to each other, SPO triples other than the most concise SPO triple may be removed, thereby reducing redundant relations.

The POS tags may be configured to indicate classes of the words in sentences of an input document. For example, the POS tags may include: noun single ("NN"), noun plural ("NNS"), verb base form ("VB"), verb past tense ("VBD"), adjective ("ADJ"), and preposition ("IN"), etc., and the POS tags may be placed after each word of a sentence, delimited by a slash, to indicate the classes of the words.

In some embodiments, given a plurality of SPO triples similar to each other, if a word is indicated by a corresponding POS tag to be in a past tense or in a plural form, the relation reduction algorithm may be configured to replace such word with its simplest expression (e.g., the present tense or the singular form). For example, given SPO triples "Poroshenko—discussed—military cooperation" and "Poroshenko—discussed—cooperation", the word "discussed" may be indicated to be in a verb past tense by a POS tag "VBD". Thus, the relation reduction algorithm may be applied to replace "discussed" with its simplest expression "discuss", such that the SPO triple "Poroshenko—discussed—military cooperation" becomes "Poroshenko—discuss—military cooperation", and the SPO triple "Poroshenko—discussed—cooperation" becomes "Poroshenko—discuss—cooperation".

Further, for words indicated by their corresponding POS tags as adjective or preposition, such words may be removed from the corresponding SPO triples to further simplify the SPO triples. For example, given the aforementioned SPO triple "Poroshenko—discuss—military cooperation", the word "military" may be identified by the POS tag as an adjective, and is thus removed. Accordingly, the SPO triple "Poroshenko—discuss—military cooperation" is further simplified as "Poroshenko—discuss—cooperation".

Thus, for SPO triples "Poroshenko—discussed—military cooperation" and "Poroshenko—discussed—cooperation", the most concise SPO triple "Poroshenko—discuss—cooperation" is obtained using the relation reduction algorithm. Further, the most concise SPO triple may be retained as the final SPO triple in the local KG, while all other similar SPO triples are deleted. Further, in case several similar SPO triples are processed using the relation reduction algorithm to obtain the same most concise SPO triples, only one copy of the most concise SPO triple is retained in the local KG. Accordingly, noise caused by the verb tenses, difference between singular and plural nouns, or meaningless adjectives is reduced.

For example, Table II shows an example of relation reduction for SPO triples. As shown in Table 2, the upper portion shows the original SPO triples extracted by the Open IE package for each message in the aforementioned Twitter dataset about Ukraine. The lower portion shows the SPO triple(s) after the relation reduction process. It is found that after applying the relation reduction algorithm, redundant entities and relations are removed, i.e., seven original SPO triples are reduced to two final SPO triples.

TABLE II

EXAMPLE OF RELATION ELIMINATION

Original SPO triples

Poroshenko discussed military cooperation
Poroshenko discussed cooperation during Zapad 2017
Poroshenko discussed cooperation
Reform is overdue
Reform is long overdue
Comprehensive reform is long overdue
Comprehensive reform is overdue Final SPO triples <Poroshenko, discuss, cooperation>
<reform, is, overdue>

Further, in some embodiments, given different entity expressions (e.g., different entity names) referring to the same entity, an openly available large KG (e.g., the Google KG) may be applied to select a desired entity name for representing the entity in the local KG, thereby reducing the noise generated by different entity expressions. Optionally, instead of a desired entity name, a unique entity identifier may be applied to represent each entity in the local KG. That is, for each subject and object in the extracted SPO triples, the name of the entity or the identifier of the entity may be mapped in the Google KG or Wikipedia, thus decreasing the possibility of multiple expressions of the same entity.

For example, in the disclosed local knowledge graph constructed from the dataset regarding Ukraine, "Ukraine pres Poroshenko", "president Poroshenko" and "pres @poroshenko" may be three different expressions of a same entity. Under this situation, the Google KG or the Wikipedia may be applied to locate and identify a desired entity name (or identifier), that is, "Petro Poroshenko" may be identified to be the entity name in the Google KG that corresponds to "Ukraine pres Poroshenko", "president Poroshenko" and "pres @poroshenko". Thus, "Petro Poroshenko" may be applied as the final entity name to replace "Ukraine pres Poroshenko", "president Poroshenko" and "pres @poroshenko", respectively, in the local KG.

Table III shows an example of applying the entity resolution process on the aforementioned Twitter dataset. As shown in Table III, at least 6 different expression exist in the Twitter dataset for the same entity "Petro Poroshenko", and after the entity resolution process, the entity name "Petro Poroshenko" is identified in the Google KG and is used as the final entity to replace all original entities having different expressions.

TABLE III

EXAMPLE OF ENTITY RESOLUTION

| Original Entities | Final Entities in Google KG |
| --- | --- |
| petro Poroshenko | Name: Petro Poroshenko |
| Ukraine pres Poroshenko | Identifier: kg:/m/08w60w |
| ukraine @ poroshenko | un: https://en.wikipedia.org/wiki/Petro_Poroshenko |
| poroshenko | |
| president Poroshenko | |
| pres Poroshenko | |

Thus, entity resolution helps to reduce noises and facilitate the construction of a more efficient local graph knowledge. Optionally, as shown in Table III, based on the Google KG, for the entity "Petro Poroshenko", the corresponding identifier may be obtained as kg:/m/08w60w, and based on the Wikipedia, a corresponding URL of the entity "Petro Poroshenko" may be obtained: https://en.wikipedia.org/wiki/Petro_Poroshenko.

As such, after relation reduction and entity resolution, a local KG may be constructed. FIG. 1 illustrates an example of a portion of the local KG related to "petro poroshenko". As shown in FIG. 1, the local KG may include a plurality of nodes 101 and a plurality of relations 102, where a relation 102 links two nodes 101 (i.e., a subject and an object, respectively) to form a SPO triple.

For example, the plurality of nodes 101 may include "telephone", "jim mattis", "target", "rex tillerson", "talk", "bridge", "activism", "petro poroshenko", "law", and "tbilisi", etc. The plurality of relations 102 may include "call", "meet", "greet", "is with", "connect", "demand", "arrive", "sign", and "arrive", etc. Thus, a plurality of SPO triples may be formed, such as "telephone—call—petro poroshenko", "jim mattis—meet—petro poroshenko", "petro poroshenko—sign—law", and "petro poroshenko—arrive—tbilisi", etc.

Further, two SPO triples may be linked to each other via a hub node, where the hub node is a node being both a subject and an object. For example, the SPO triple "jim mattis—meet—petro poroshenko" may be linked to the SPO triple "petro poroshenko—sign—law" via the hub node "petro poroshenko". That is, the object "petro poroshenko" of the SPO triple "jim mattis—meet—petro poroshenko" may be used as the subject of the SPO triple "petro poroshenko—welcome—alexander lukashenko", and "petro poroshenko" is a hub node.

Optionally, the local KG may include a plurality of isolated SPO triples (not shown in FIG. 1), where the isolated SPO triples refer to SPO triples that are not connected to any other SPO triples. Further, while FIG. 1 shows rich information about the hub node "petro poroshenko", the local KG may include other hub nodes, such as "Russia", "Crimea", and "Ukraine", thus presenting overall information about the topic "Ukraine".

Further, based on the local KG, activities centered around a given subject may be identified relatively easily, where an activity herein may be represented using related relation and object given the subject. Optionally, in some embodiments, an activity may be represented using a SPO triple, given different subjects.

For example, instead of serving as the object, the hub node "petro poroshenko" (name of the 5th president of Ukraine) is found to serve more as the subject in the SPO triples, due to its attribute of being a famous politician. Thus, given the hub node "petro poroshenko", a plurality of activities such as "sign law" and "welcome alexander lukashenko" may be identified relatively easily from the local KG shown in FIG. 1.

Optionally, the based on a dataset including unstructured data collected within a certain period, constructing a local KG (S1) may further include: clustering entities to provide a global picture of entities-of-interest (S109). In some embodiments, the aforementioned existing knowledge graph WordNet may be applied to cluster entities, thereby better displaying and tracking activities associated with entities-of-interest. Accordingly, by exploring relations between objects directly linked to the subject "Petro Poroshenko", more information related to entities-of-interest may be obtained. For example, referring to FIG. 1, the knowledge graph can provide a global picture about the entity-of-interest (i.e., "Petro Poroshenko"), and provide existing "facts" for verification of potential anomalies.

Further, the local knowledge graph constructed so far may still be sparse, incomplete, and noisy, such that unknown or hidden relations between different entities need to be identified. Accordingly, the method for pattern discovery and real-time anomaly detection based on knowledge graph may further include followings.

At S2: applying a statistical relational learning (SRL) model to predict hidden relations between entities for the local KG.

To describe the SRL model of the local knowledge graph, $E=\{e_1, \ldots, e_{N_e}\}$ is denoted as the set of entities, and $R=\{r_1, \ldots, r_{N_r}\}$ is denoted as the set of relations, where $N_e$ is the total number of entities and $N_r$ is the total number of relations. A SPO triple may be defined by $x_{ijk}=(e_i, r_k, e_j)$, and a binary random variable $y_{ijk} \in \{0,1\}$ may be applied to characterize whether the SPO triple exists, where $$y_{ijk} = \begin{cases} 1 & \text{if the triple } (e_i, r_k, e_j) \text{ exists} \\ 0 & \text{otherwise} \end{cases} \quad (1)$$

Further, to predict hidden relations between entities of the local KG, a probability of existence may be calculated for each triple $x_{ijk}$. For example, a score function $f(x_{ijk}; \theta)$ may be applied to calculate the probability of existence of $x_{ijk}$ as a function of unknown parameter(s) $\theta$ be learned in the training process, where $\theta$ can be a scalar or a vector. In one embodiment, given the probability distribution of the existence of entities being a Bernoulli distribution, $f(x_{ijk}; \theta)$ may be defined as follows:

$$f(x_{ijk}; \theta) = B(y_{ijk} \mid \sigma(f(x_{ijk}; \theta))) = \begin{cases} \sigma(f(x_{ijk}; \theta)) & \text{if } y_{ijk}=1 \\ 1-\sigma(f(x_{ijk}; \theta)) & \text{if } y_{ijk}=0 \end{cases}$$

where $\sigma(f(x_{ijk}; \theta))$ is the logistic function.

Thus, for existence of triples $x^1, x^2, \ldots x^n$, the overall likelihood may be calculated via the product of the individual likelihoods, and expressed as below:

$$\Pi_{n=1}^{N_d} f(x^n;\theta) = \Pi_{n=1}^{N_d} B(y^n \mid \sigma(f(x^n;\theta)))$$

Where $0 \leq n \leq N_d$, and $N_d$ is the number of observed triples.

Further, for computing convenience, the maximized log-likelihood function is applied:

$$\max_{\theta} \sum_{n=1}^{N_d} \log B(y^n \mid \sigma(f(x^n;\theta))) \quad (2)$$

Optionally, $f(x_{ijk};\theta)$ may be defined in other manners. For example, a link prediction algorithm RESCAL based on the bilinear model is applied to predict potential relations between entities, which is expressed as:

$$f_{ijk}^{RESCAL} = e_i^T W_k e_j \quad (4)$$

where $e_i$ and $e_j$ are the latent feature representation of the entity $e_i$ and $e_j$, respectively, and $W_k$ represents the bilinear weight matrix of relation $r_k$. Note that Eq. (4) is based on the assumption that $y_{ijk}$ are conditionally independent given latent features associated with the entities.

At S3: establishing a normalcy pattern including frequent entities, frequent relations, and frequent triples.

Figure 8A:
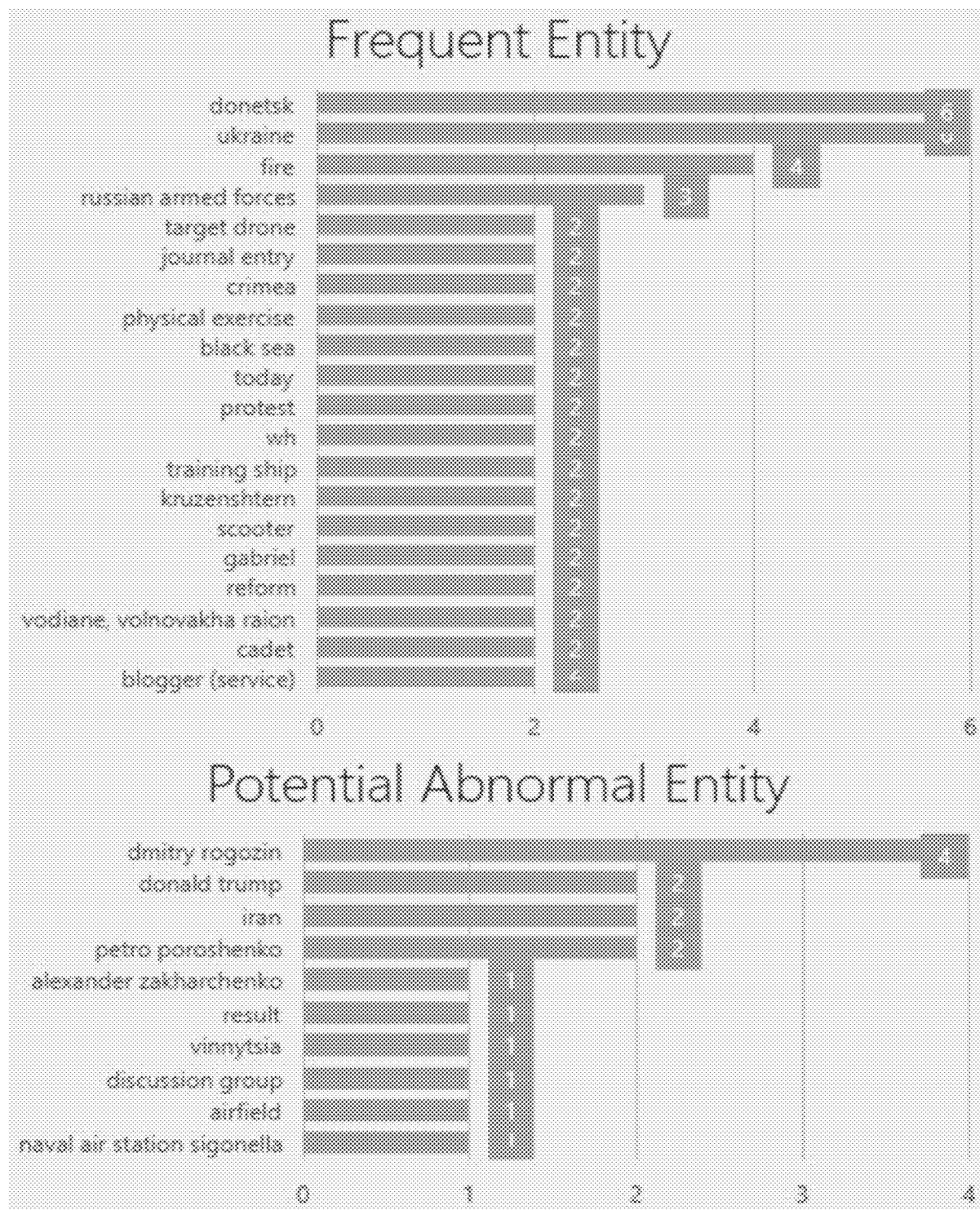
FIG. 8A-8C illustrates a process of pattern discovery and real-time anomaly detection according to some embodiments of the present disclosure.
Figure 8B:
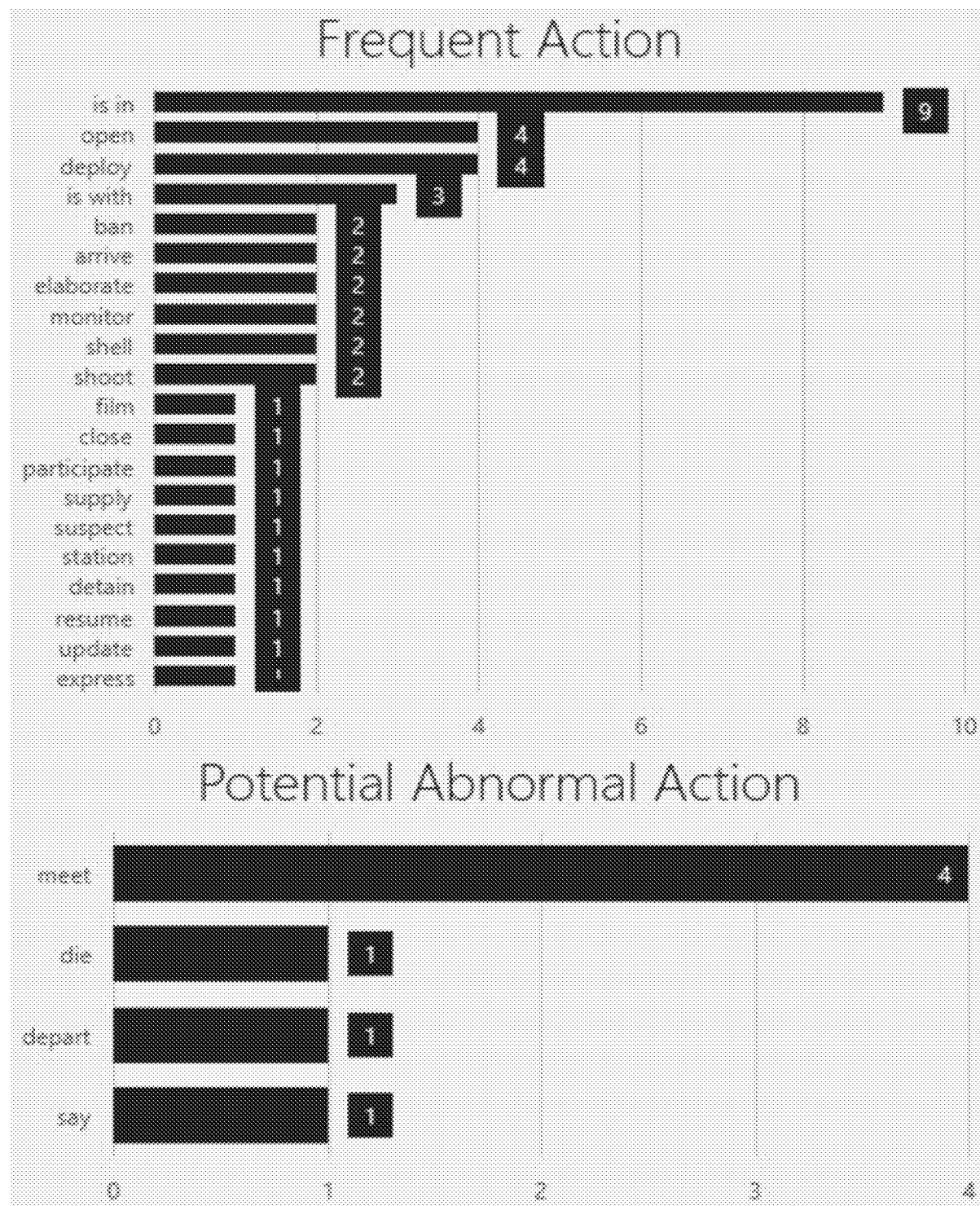
Figure 8C:
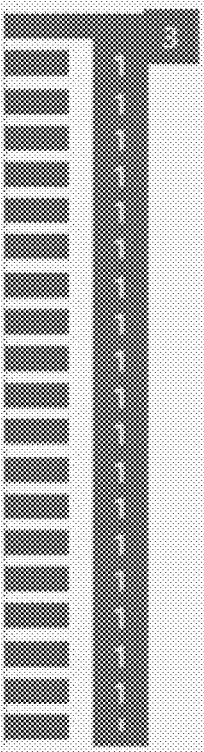
Figure 8C:
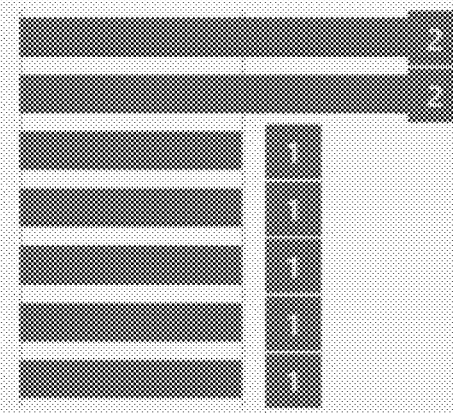

Based on extracted and the aforementioned hidden SPO triples, an Apriori algorithm may be applied to identify frequent subject (S), object (O), predicate (P) and any combination thereof, thereby establishing a normalcy pattern that stores frequent entities, relations, and triples (see examples in FIG. 8A~8C). The Apriori algorithm is an algorithm for learning association rules and mining frequent item sets, which starts with identifying the frequent items in a given dataset. An item herein may refer to an entity or a relation, and items appearing sufficiently frequent may be identified as frequent items. Further, frequent items belonging to a same type may together form a frequent item set. The identified frequent items are then used to determine association rules, i.e., the frequent associations (i.e., relations) between items.

Denote I={i1, i2, . . . in} as a set of items in a transaction T, the threshold of support value $\sigma_{max}$ may be used to determine frequent items. The transaction T herein may refer to an event or a dataset. That is, when an item or an item set occurs in the transaction T at least $\sigma_{max}$ times, the item or the item set is considered to be frequent items. The Apriori algorithm uses a hash tree structure and applies a breadth-first search mode to count candidate item sets efficiently.

Table IV shows the pseudo code for the Apriori algorithm. As shown in Table IV, input parameters of the Apriori algorithm may include a data set T and the threshold of support value $\sigma_{max}$. At the beginning, all single items with support value≥$\sigma_{max}$ are qualified for output. The algorithm iteratively generates the candidate sets at each step, from the large item sets obtained from the preceding level, to find frequent item sets and use them to generate association rules based on the minimum confidence threshold. The minimum confidence threshold may be defined by a user based on specific requirements.

TABLE IV

APRIORI ALGORITHM
Algorithm 1: Apriori Algorithm

```
Apriori (T, σ)
L₁ ← {large 1-itemsets}
k ← 2
while L_k ≠ ∅:
    C_k ← {a ∪ {b} |a ∈ L_{k-1} ∧ b ≠ a} -
        {c| {s|s ⊆ c ∧ |s| = k - 1} ⊄ L_{k-1}}
    for transactions t ∈ T:
        C_t ← {c|c ∈ C_k ∧ c ⊆ t}
        for candidates c ∈ C_t:
            count[c] ← count[c] + 1
    L_k ← {c|c ∈ C_k ∧ count[c] ≥ σ
    k ← k + 1
Return ∪_k L_k
```

In practical implementation, all SPO triples may be collected in a sliding window, and the Apriori algorithm may be applied with a minimum support value $\sigma_{min}$. By ranking the frequent size-1 items (e.g., frequent subject) with a frequency from high to low, we obtained the most important subjects, objects and predicates of the local knowledge graph. The size-2 frequent items (e.g., frequent subject-object) can reveal the associations of subject-object, subject-predict and predict-object, and the size-3 frequent items are the frequent SPO triples, which represent important activities and events.

Figure 2A:
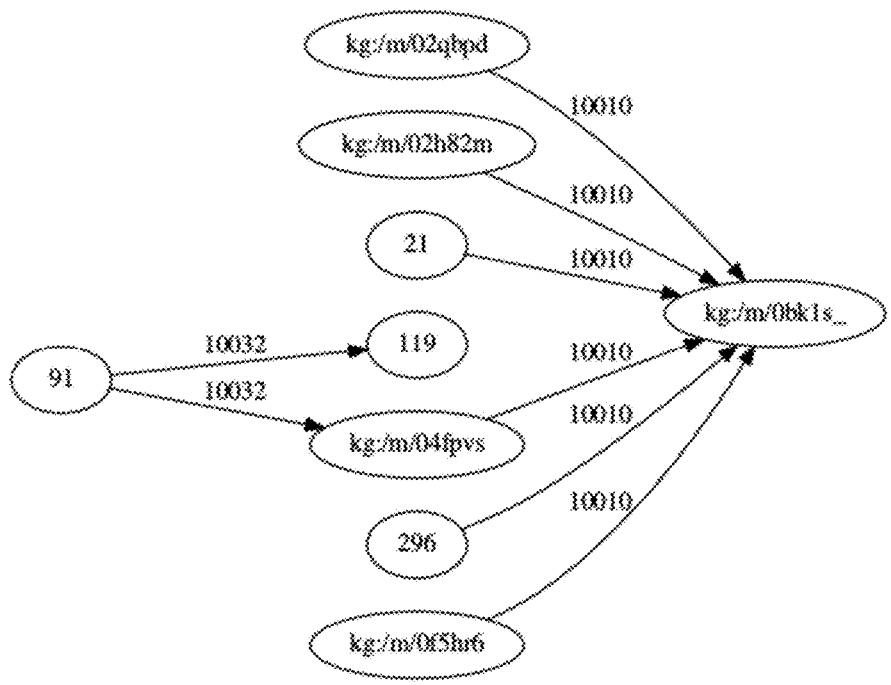
FIG. 2A illustrates frequent SPOs regarding to an activity "open fire", in which nodes are represented by identifiers.
Figure 2B:
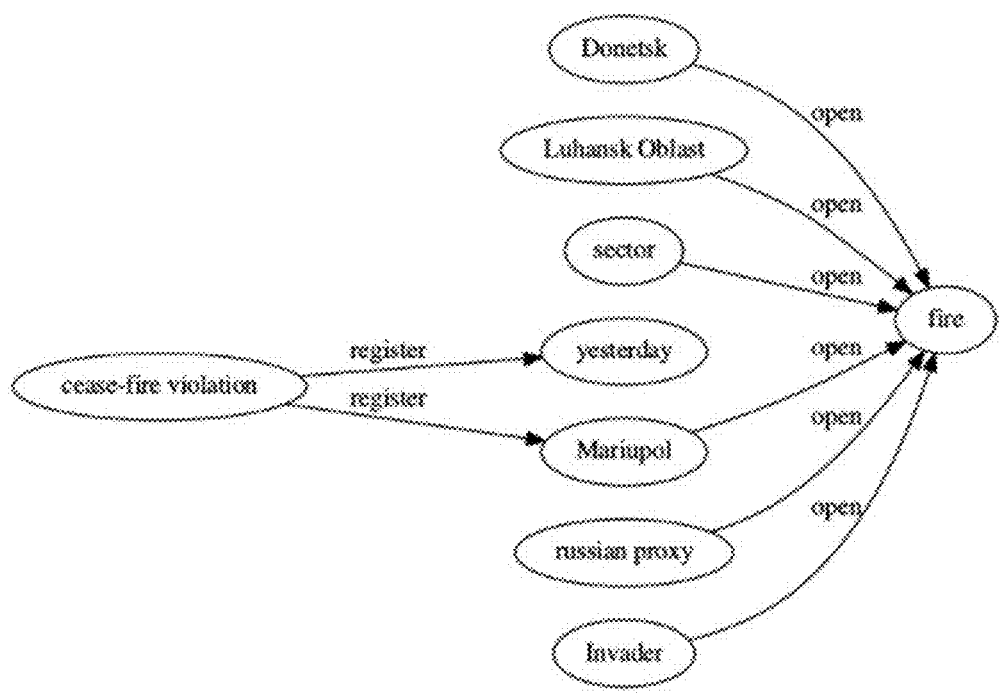
FIG. 2B illustrates frequent SPOs regarding to an activity "open fire", in which nodes are represented by names.

FIG. 2A and FIG. 2B illustrate the frequent SPOs regarding the activity "open fire" in a local KG constructed based on messages collected from https://liveuamap.com/ during August 2017. As shown in FIG. 2A, all the nodes and edges are represented by corresponding entity identifiers. The entity identifiers may be numbers or strings, obtained based on a combination of the local KG and the Google KG. For example, because an extracted entity "fire" can be mapped to an identifier "kg:/m/0bkls_" of the entity "fire" in the Google KG, the node "fire" may be represented by "kg:/m/0bkls_" in the local KG, instead of its name. Further, because the relation "open" in the local KG cannot be mapped to any identifier in the Google KG, the relation "open" may be represented by a local identifier of the entity "open" (i.e., the number 10010).

Other identifiers in FIG. 2A may include: "kg:/m/02qbpd" for entity "Donetsk", "kg:/m/02h82m" for "Luhansk Oblast", "21" for "sector", "119" for "yesterday", "kg:/m/04fpvs" for "Mariupol", "296" for "russian proxy", "kg:/m/0f5hr6" for "Invader", "91" for "cease-fire violation", and "10032" for "register".

That is, for a node in the local KG that can be mapped to an entity in Google KG during the aforementioned entity resolution process, an identifier of the entity in the Google KG may be applied to represent the node in the local KG, in the form of "Kg://xxxxxx". Further, for a node that cannot be mapped to any entity in the Google KG, a local identifier such as a number may be applied to represent the node.

Optionally, as shown in FIG. 2B, all the nodes and edges may be represented by their names, from which frequent entities such as "open" and "fire" may be identified. Further, based on SPO triples such as "Donetsk—open—fire", "Luhansk Oblast—open—fire", and "Mariupol—open—fire", locations having the activities "open fire" may be identified, including "Donetsk", "Luhansk Oblast", and "Mariupol". For SPO triples such as "sector open fire" and "cease-fire violation register yesterday" that have vague meaning, a refining process may be further applied. For example, temporal and spatial information may be introduced to refine the local KG.

Optionally, for a frequent entity or a frequent activity that includes the frequent entity, a mining algorithm may be applied to discover a hidden frequent pattern related to the frequent activity. A hidden frequent pattern herein may include a plurality of frequent sequential entities related to the frequent entity.

In some embodiments, to detect a hidden frequent pattern such as frequent sequential entities, messages regarding a frequent entity or a frequent activity may be collected within each month as monthly data, and based on the monthly data, sequential entities may be identified. For example, based on FIG. 2B, "open fire" is identified to be a frequent activity in the local KG. Thus, to identify entities connected to the activity "open fire", a frequent sequential pattern mining approach, such as the PrefixSpan algorithm, may be applied on the monthly data to obtain sequential entities and corresponding frequencies, such that sequential entities with corresponding frequencies higher than a preset value may be identified as frequent sequential entities. The obtained sequential entities and their corresponding frequencies are shown in Table V.

TABLE IV

FREQUENT SEQUENTIAL PATTERNS ABOUT "OPEN FIRE"

| Sequential Entities | Frequency |
|---|---|
| Invader -> militant | 3 |
| Donetsk -> Donetsk -> Donetsk | 4 |
| Donetsk -> Invader | 4 |
| 48.417, 38.033 -> 48.124, 37.769 (Zaitseve, Donetsk → Avdiivka, Donetsk) | 3 |

TABLE IV-continued

FREQUENT SEQUENTIAL PATTERNS ABOUT "OPEN FIRE"

| Sequential Entities | Frequency |
|---|---|
| 48.124, 37.769 -> 48.124, 37.769 (Avdiivka, Donetsk -> Avdiivka, Donetsk) | 5 |
| 48.124, 37.769 -> 48.417, 38.033 (Avdiivka, Donetsk → Zaitseve, Donetsk) | 3 |

As shown in Table V, the sequential entities "Invader→militant" indicates the activity "invader open fire" is usually followed by the activity "militant open fire". The sequential pattern "Donetsk→Donetsk→Donetsk" with a frequency value 4 indicates that Donetsk is the major battlefield, as the activity "Donetsk open fire" occurs frequently (i.e., four times).

Further, locations of the sequential entities may be introduced, where a location may be identified by a (latitude, longitude) pair. For example, frequent (latitude, longitude) pairs may be found to be (48.417, 38.033) and (48.124, 37.769), corresponding to two major cities Zaitseve and Avdiivka of the Donetsk province in Ukraine, which face the warfare threaten. Thus, a sequential entity "48.417, 38.033→48.124,37.769" may be translated into "Zaitseve, Donetsk→Avdiivka, Donetsk".

Similarly, a sequential entity "48.124,37.769→48.124, 37.769" may be translated into (Avdiivka, Donetsk→Avdiivka, Donetsk). A sequential entity "48.124, 37.769→48.417,38.033" may be translated into "Avdiivka, Donetsk→Zaitseve, Donetsk".

Optionally, based on the chronological order of the two frequent sequential entities "Zaitseve, Donetsk→Avdiivka, Donetsk" and "Avdiivka, Donetsk→Zaitseve, Donetsk", provided by Table V it may be learned that warfare battles tend to occur from Zaitseve to Avdiivka and then back to Zaitseve. Accordingly, a hidden pattern (e.g., frequent sequential entities) may be detected and may be further applied to predict future activities.

At S4: in response to receiving an input document, extracting a plurality of entities, a plurality of relations, and a plurality of SPO triples from the input document to determine whether there is an abnormal word, thereby detecting an abnormal entity, relation, or SPO triple in the input document. Optionally, the processing process described at S4 may also be applied in response to receiving streaming data.

More specifically, after obtaining the normalcy pattern from the local KG, the activities of the most important entity or a frequent entity in the normalcy pattern may be tracked, such that abnormal activities may be detected. Further, the activities may be tracked continuously with corresponding locations.

In some embodiments, twitter messages within the second period (e.g., a most recent month) may be collected to form an input document. Further, given a frequent entity, a plurality of SPO triples that include the frequent entity as a subject or an object may be identified in the input document, where each SPO triple corresponds to an activity of the frequent entity. The plurality of SPO triples may be stored in a table for anomaly detection. Optionally, the table for anomaly detection may further store location information for each activity to which a SPO triple corresponds.

Further, whether the table for anomaly detection includes abnormal words or terms such as "bomb" may be determined, and if there are abnormal words or terms, the subject(s), object(s), predicate(s), or the location information associated with the abnormal words or terms may be identified. Thus, an anomaly may be detected, which may be an abnormal predicate, an abnormal subject or object, an abnormal activity, an abnormal SPO triple, an uncommon location, or a sudden location change, etc.

For example, based on the normalcy pattern, the Ukraine capital "Kiev (Kyiv)" is known to be a frequent entity, and activities about "Kiev" may be tracked. That is, given tweets messages regarding Ukraine between late August 2017 and early September 2017, SPO triples associated with the frequent entity "Kiev" may be identified and list in Table VI in a chronological order. As "Kiev" itself is a location (city), the location information represented using, for example, a (latitude, longitude) pair may be omitted.

As shown in Table VI, anomalies such as abnormal subjects "wreckage" and "car bomb", and abnormal predicates "kidnap", "explode", and "bomb" are detected. That is, anomaly detection is implemented.

TABLE VI

Table for anomaly detection related to a frequent entity "Kiev"

| Subject | Predicate | Object |
|---|---|---|
| James mattis | is in | Kiev |
| monument | vandalize | Kiev |
| exhibition | is in | Kiev |
| shooting | is in | Kiev |
| Kiev | regain | control |
| visit | is in | Kiev |
| Anna Kurbatova | kidnap | Kiev |
| journalist | is in | Kiev |
| rally | is in | Kiev |
| rally | is in | Kiev |
| car | explode | Kiev |
| wreckage | bomb | Kiev |
| car bomb | is in | Kiev |
| car bomb | is in | Kiev |

Under certain situations, without background knowledge of the entities, some anomalies may not be detected simply by identifying abnormal words or terms in the table for anomaly detection. For example, referring once again to Table VI, the subject "James Mattis", which is the name of the United States Secretary of Defense, may not be detected as an abnormal term without certain background knowledge, such that the activity "James Mattis is in Kiev" may not be identified as a potential anomaly. To address this issue, a large KG such as the Google KG is relied on to obtain background knowledge about entities and relations therebetween.

In implementation, to determine which of the two SPO triples "James Mattis—is in—Kiev" and "Petro Poroshenko—is in—Kiev" reveals an activity that is more unusual, large KGs, such as a Google KG, may be queried to obtain background knowledge of the entities "James Mattis" and "Petro Poroshenko", respectively. For example, FIG. 3 illustrates an example of obtaining background knowledge for entities "James Mattis" and "Petro Poroshenko" based on Google KG and Wikipedia to better detect a potential anomaly.

Figure 3:
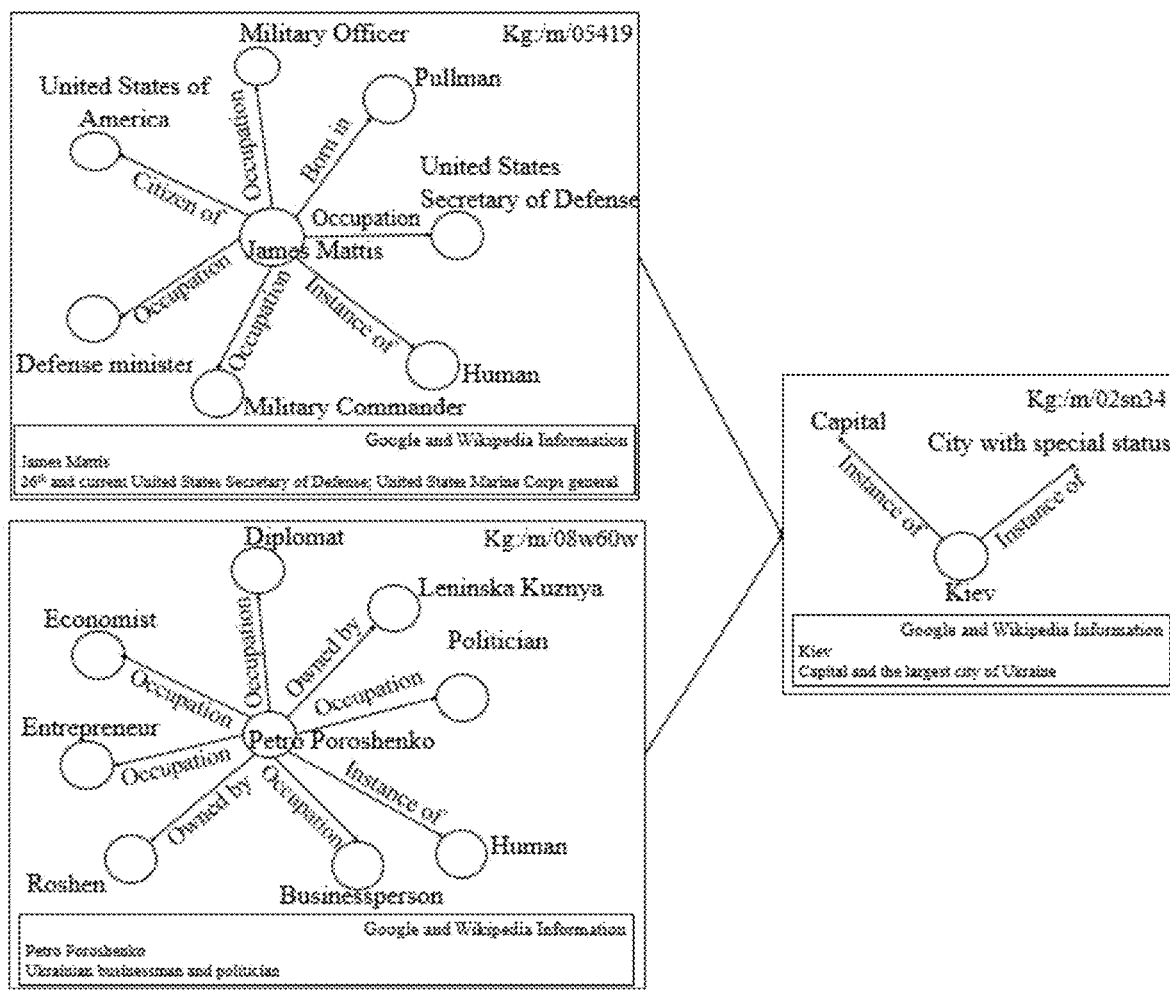
FIG. 3 illustrates an example of obtaining background knowledge from Google KG to detect potential anomaly according to some embodiments of the present disclosure.

As shown in FIG. 3, in the Google KG, the entity "james mattis" may correspond to a plurality of nodes 301 and a plurality of edges 302, thus forming a plurality of SPO triples such as "james mattis—citizen of—United States of America", and "james mattis—occupation—United States Secretary of Defense". Further, by capturing the occupation attribute of the entity "james mattis", the key information that james Mattis works as the US Secretary of Defense may be extracted. Optionally, a search may be further conducted on Wikipedia to further confirm that "james Mattis is the 26th and current United States Secretary of Defense and United States Marine Corps general".

Similarly, the entity "petro peroshenko" may correspond to a plurality of nodes 301 and edges 302 in the Google KG, which forms a plurality of SPO triples such as "petro poroshenko—owned by—Leninska Kuzmya" and "petro poroshenko—occupation—politician". By capturing the occupation attribute, it is known that petro poroshenko is at least a politician, business person and diplomat. By further search through Wikipedia, the desired background information may be obtained, i.e., "Petro Poroshenko is the president of Ukraine and a Ukraine businessman and politician".

Further, the entity "Kiev" may also correspond to a plurality of nodes 301 and edges 302 in the Google KG, which forms a plurality of SPO triples such as "Kiev—instance of—Capital" and "Kiev—instance of—City with special status". Based on the Google KG and Wikipedia, the entity "Kiev" is known to be the capital and the largest city of Ukraine.

Thus, it can be determined that SPO triple "Petro Poroshenko—is in—Kiev" is more usual than "James Mattis—is in—Kiev". In other words, the SPO triple "James Mattis—is in—Kiev" may be identified as an anomaly. Accordingly, based on a large KG such as Google KG and Wikipedia, background knowledge of entities may be extracted to help detect anomalies about activities or events.

Figure 4:
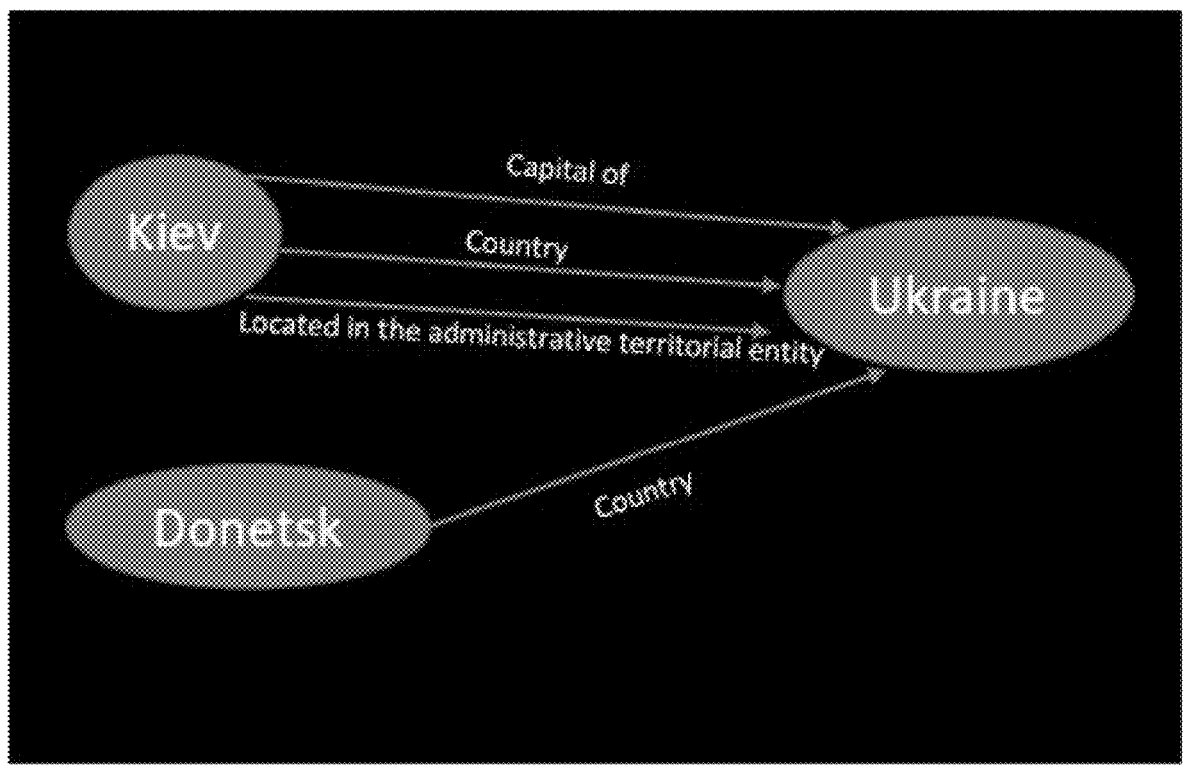
FIG. 4 illustrates an example of extracting relations between entities from Wikidata according to some embodiments of the present disclosure.

In some embodiments, the relation(s) between two entities may be queried from Wikidata for better acquiring the background knowledge. For example, FIG. 4 illustrates an example of relations between entities extracted from Wikidata. As shown in FIG. 4, to verify attributes of "Kiev" and "Donetsk" in the aforementioned local KG regarding Ukarine, the relations between "Kiev" and "Ukraine", as well as the relations between "Donetsk" and "Ukraine" are queried from Wikidata, and the query result indicates at least that Kiev is the capital of Ukraine, and Donetsk is a city of Ukraine. Such background knowledge may provide basic but crucial knowledge for better anomaly detection.

At S5, in response to receiving streaming data from a message bus, extracting a plurality of entities, a plurality of relations, and a plurality of SPO triples, from the streaming data for comparison with the normalcy pattern using semantic distance, thereby determining whether there is an abnormal entity, relation, or SPO triple in the streaming data. The message bus herein may be, for example, Kafka.

For example, when a semantic distance between an entity extracted from the streaming data and a frequent entity in the normalcy pattern is greater than a preset value, determining the entity extracted from the streaming data as an abnormal entity. when a semantic distance between a relation extracted from the streaming data and a frequent relation in the normalcy pattern is greater than a preset value, determining the relation extracted from the streaming data as an abnormal relation. When a semantic distance between a SPO triple extracted from the streaming data and a frequent SPO triple in the normalcy pattern is greater than a preset value, determining the SPO extracted from the streaming data as an abnormal SPO triple.

It is worth noting that, the streaming data may possess additional information, such as the temporal information. To explore the temporal information of the streaming data, the aforementioned PrefixSpan algorithm may be applied to identify frequent sequential entities from the streaming data. Implementation details are based on definitions of subsequence, super-sequence, prefix, and projection, which are illustrated hereinafter.

Given two sequences $\alpha=<\alpha_1, \alpha_2, \ldots \alpha_n>$ and $\beta=<\beta_1, \beta_2, \ldots \beta_m>$, when $\alpha_1 \subseteq \beta_{j_1}, \alpha_2 \subseteq \beta_{j_2}, \ldots, \alpha_n \subseteq \beta_{j_n}$ ($1 \leq j_1 < j_2 < \ldots < j_n \leq m$), a is referred to as a subsequence of $\beta$, and $\beta$ is referred to as a super-sequence of $\alpha$.

Given two sequences $\alpha=<\alpha_1, \alpha_2, \ldots, \alpha_n>$ and $\beta=<\beta_1, \beta_2, \ldots, \beta_m>$, where $m \leq n$, sequence $\beta$ is called a prefix of $\alpha$ if and only if $\beta_i = \alpha_i$, ($1 \leq i \leq m$).

Given two sequences $\alpha$ and $\beta$ such that $\alpha$ is a subsequence of $\beta$, a subsequence $\beta'$ of sequence $\beta$ is called a projection of $\beta$ with respect to prefix $\alpha$ if and only if: (1) $\beta'$ has prefix $\alpha$, (2) there exist no proper super-sequences $\beta''$ of $\beta'$ such that $\beta''$ is a subsequence of $\beta$ and also has prefix $\alpha$.

Thus, the PrefixSpan algorithm may be given herein below in table VII.

TABLE VII

PREFIXSPAN ALGORITHM
Algorithm 2: PrefixSpan Algorithm

Input: A sequence dataset S, and the minimum support threshold min_support
Output: The complete set of sequential patterns
Method: PrefixSpan (< >, 0, S)
Subroutine PrefixSpan ($\alpha$, len, S|$\alpha$):
1: Scan S|$\alpha$ once and find the set of frequent items $\beta$ such that:
 a. $\beta$ can be assembled to the last element of $\alpha$ to from a sequential pattern; or
 b. < $\beta$ > can be appended to $\alpha$ to form a sequential pattern.
2: For each frequent item $\beta$, append it to $\alpha$ to form a sequential pattern $\alpha'$ and output $\alpha'$;
For each $\alpha'$, construct $\alpha'$-projected dataset S|$\alpha'$, and call PrefixSpan ($\alpha'$, len+1, S|$\alpha'$)

The present disclosure further provides a system for pattern discovery and real-time anomaly detection, including at least a processor and a memory. The memory may be configured to store one or more programs, and when executed by the at least one processor, the one or more programs may perform the aforementioned method for pattern discovery and real-time anomaly detection based on knowledge graph, which includes followings:

S1, based on a dataset including messages collected within a certain period, constructing a local knowledge graph (KG), wherein the local KG includes a plurality of nodes for denoting a plurality of entities and a plurality of edges for denoting a plurality of relations, an entity is a subject or an object, and a relation is a predicate that couples a subject to an object to form a subject-predicate-object (SPO) triple;

S2, applying a statistical relational learning (SRL) model to predict hidden relations between entities to obtain an updated local KG;

S3, from all SPO triples of the updated local KG, discovering a normalcy pattern that includes frequent entities, frequent relations, and frequent SPO triples;

S4, in response to receiving an input document, extracting a plurality of entities, a plurality of relations, and a plurality of SPO triples from the input document to determine whether there is an abnormal word, thereby detecting an abnormal entity, relation, or SPO triple in the input document; and S5, in response to receiving streaming data from a message bus, extracting a plurality of entities, a plurality of relations, and a plurality of SPO triples, from the streaming data for comparison with the normalcy pattern using semantic distance, thereby determining whether there is an abnormal entity, relation, or SPO triple in the streaming data.

Detailed descriptions of the above-described method may refer to corresponding parts of the present disclosure, and repeated descriptions are not provided herein.

Figure 5:
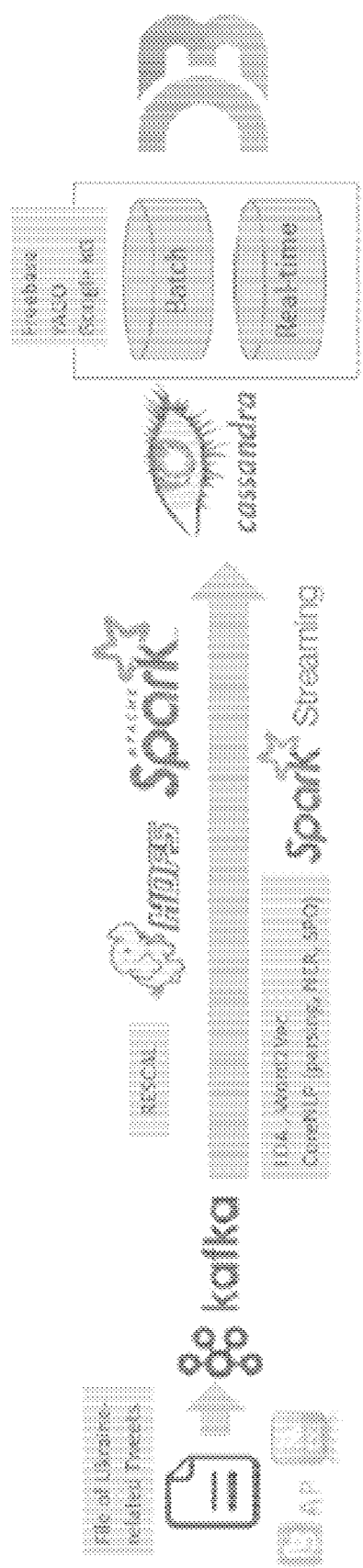
FIG. 5 illustrates a computational infrastructure including a computational engine using Lambda framework according to some embodiments of the present disclosure.

Further, the present disclosure further provides a computing infrastructure for pattern discovery and real-time anomaly detection based on knowledge graph, in which multiple open source tools are applied. For example, FIG. 5 illustrates a computing infrastructure for pattern discovery and real-time anomaly detection based on knowledge graph that includes a computational engine using a Lambda framework. As shown in FIG. 5, the computing infrastructure may have a real-time mode or a batch mode, and the lambda framework may include a batch processing layer using Apache Hadoop and a streaming processing layer using Apache Spark. The knowledge graph data may be stored by Apache Cassandra and visualized by D3.js. The Apache Cassandra is an open source data store currently available online at cassandara.apache.org, and is selected to store data of the local KG.

In implementation, the Ukraine message stream may be obtained through Live Universal Awareness Map ("Liveuamap"). The link prediction algorithm RESCAL may be executed in the batch mode along with Hadoop Distributed File System (HDFS) and Spark. In some embodiments, knowledge graph such as Freebase, YAGO, and Google KG may be stored in the database to support the establishment of the local KG, KG refinement, entity resolution, and relations retrieval.

The Apache Hadoop is an open-source software for distributed storage and processing of large data sets built from hardware, and the Apache Spark is a large-scale data processing engine for processing in batches. As a major portion of the computational engine, the Apache Spark provides batch-layer processing, such as link prediction using RESCAL. Further, Spark Streaming processes the streaming data in a real-time fashion, such as extracting hidden topics using Linear Discriminant LDA, finding semantic-related words by Word2vec, and extracting SPO triples using Stanford CoreNLP. By introducing Apache Spark, the computing time of a computing device is reduced.

Figure 6:
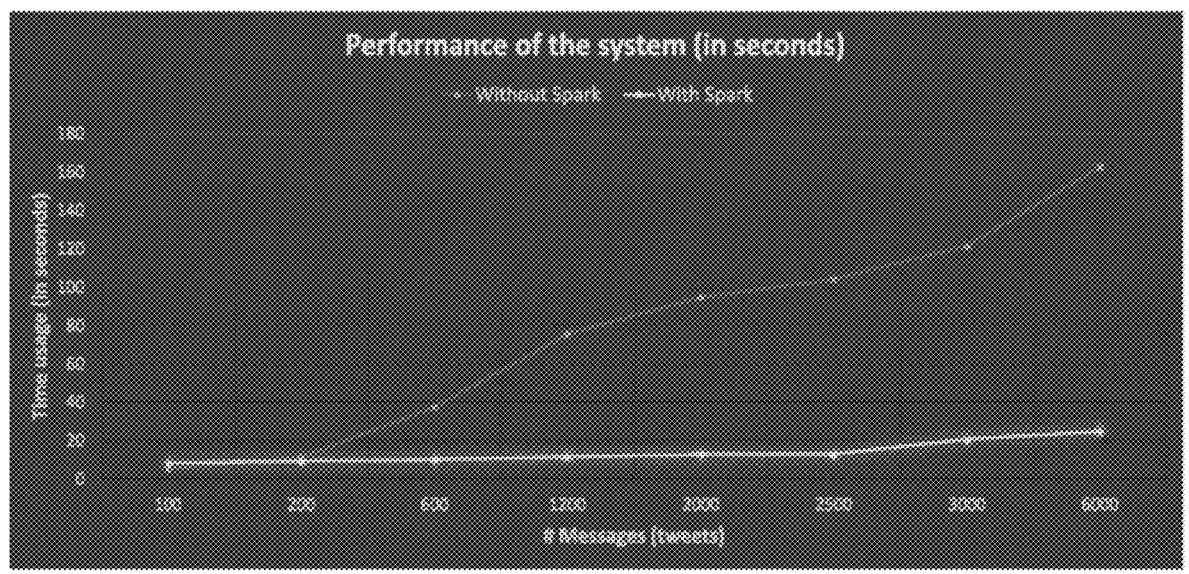
FIG. 6 illustrates computational time of a computing device with and without Apache Spark according to some embodiments of the present disclosure.

FIG. 6 illustrates computation time of a system with or without Apache Spark. As shown in FIG. 6, while the computation time of a computing device (Intel Core i7 with 4 cores, 8 GB RAM) without Apache Spark increases rapidly as the number of tweets messages increase, the computation time of the same system with Apache Spark remains constantly low regardless of the number of the tweets messages. Accordingly, the introduction of the Apache Spark may help keep the computation time of a system substantially short.

Figure 7:
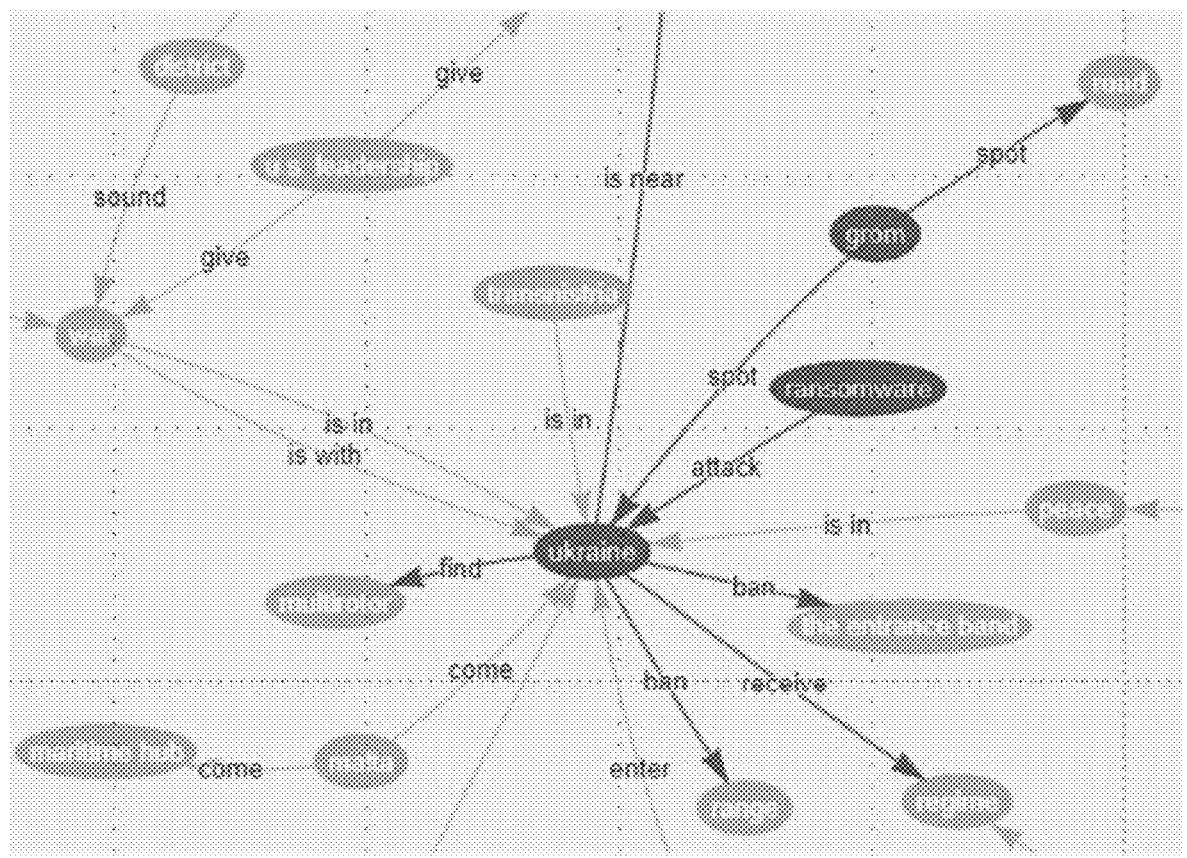
FIG. 7 illustrates a snapshot of a local Knowledge Graph currently being built according to some embodiments of the present disclosure.

FIG. 7 illustrates a snapshot of a local KG built in real time for potential anomaly detection. As shown in FIG. 7, when the knowledge graph is being constructed, the link prediction algorithm RESCAL may be employed to predict missing relations between nodes.

Further, a sliding-window based method may be applied to detect potential anomalies in terms of entity, relation, SPO triple, and/or location. For example, a normalcy pattern may be built on the local knowledge graph extracted from data in the sliding window, and potential anomalies are thus detected by comparing streaming data to the normalcy pattern. Optionally, the size of the sliding window may be adjusted based on the volume and update rates of the streaming data.

All entities, relations (i.e., actions), SPOs in the sliding window (i.e., information within N consecutive days) may be used to obtain the normalcy pattern, and the new information (e.g., information collected in the (N+1)th day) may be compared to the extracted normalcy pattern. Any newly-occurred pattern and the items with large deviations from the extracted normalcy pattern may be regarded as potential anomalies.

Further, to evaluate the deviation between the normalcy pattern and newly-occurred pattern or items (e.g., entity, relation, or SPO triple) with large deviations from the normalcy pattern, a semantic distance may be applied, and when the semantic distance is greater than a preset value, the newly-occurred pattern or items are considered abnormal. For example, FIG. 8A-8C show screenshots of the extracted frequent entities, frequent actions, and frequent SPO triples from the messages within a time window (window size: 4 days). The potential abnormal entities, actions, and triples shown are detected and shown based on the comparison between the streaming data and the historically extracted information. As the disclosed system processes the streaming data continually, normal location patterns may be extracted from each time window and potential abnormal locations may be detected.

Aforementioned descriptions are preferred embodiments of the present disclosure, but are not intended to limit the present disclosure. For those skilled in the art, various alterations and variations can be made in the present disclosure. Without departing from the spirit and scope of the present disclosure, any modifications, equivalent replacements, and improvements, etc. shall fall within the protection scope of the present disclosure.

What is claimed is:

1. A method for pattern discovery and real-time anomaly detection based on knowledge graph, comprising:
    based on a dataset including messages collected within a certain period, constructing a local knowledge graph (KG), wherein the local KG includes a plurality of nodes for denoting a plurality of entities and a plurality of edges for denoting a plurality of relations, an entity is a subject or an object, and a relation is a predicate that couples a subject to an object to form a subject-predicate-object (SPO) triple;
    applying a statistical relational learning (SRL) model to predict hidden relations between entities to obtain an updated local KG;
    from all SPO triples of the updated local KG, discovering a normalcy pattern that includes frequent entities, frequent relations, and frequent SPO triples; and
    in response to receiving streaming data from a message bus, extracting a plurality of entities, a plurality of relations, and a plurality of SPO triples, from the streaming data for comparison with the normalcy pattern using semantic distance, thereby determining whether there is an abnormal entity, relation, or SPO triple in the streaming data;
    wherein the updated local KG is stored in an open-source distributed data management system and is visualized using a JavaScript library through a web browser.

2. The method according to claim 1, wherein the based on a dataset including messages collected within a certain period, constructing a local knowledge graph further comprises:
    extracting the plurality of entities from the messages through a Named-Entity Recognition (NER) approach; and extracting a plurality of SPO triples from sentences of the messages through an Open Information Extraction (Open IE) package, to obtain the plurality of relations.

3. The method according to claim 2, wherein the extracting a plurality of SPO triples from sentences of the messages through an Open Information Extraction (Open IE) package, to obtain the plurality of relations further comprises:
for a plurality of extracted SPO triples that are similar to each other, identifying a most concise SPO triple using part-of-speech (POS) tags, such that among the plurality of SPO triples that are similar to each other, the most concise SPO triple is retained and other SPO triples are removed.

4. The method according to claim 3, wherein the method further comprises:
for different entity names referring to a same entity in the local KG, mapping the different entity names to an openly available large KG to select a desired entity name or a unique identity identifier for representation in the local KG.

5. The method according to claim 1, wherein the from all SPO triples of the updated local KG, discovering a normalcy pattern that includes frequent entities, frequent relations, and frequent SPO triples further includes:
applying an Apriori algorithm to identify and extract the frequent entities, the frequent relations, and the frequent SPOs.

6. The method according to claim 1, wherein the in response to receiving streaming data from a message bus, extracting a plurality of entities, a plurality of relations, and a plurality of SPO triples, from the streaming data for comparison with the normalcy pattern, thereby determining whether there is an abnormal entity, relation, or SPO triple in the streaming data further comprises:
when a semantic distance between an entity extracted from the streaming data and a frequent entity in the normalcy pattern is greater than a preset value, determining the entity extracted from the streaming data as an abnormal entity;
when a semantic distance between a relation extracted from the streaming data and a frequent relation in the normalcy pattern is greater than a preset value, determining the relation extracted from the streaming data as an abnormal relation; and
when a semantic distance between a SPO triple extracted from the streaming data and a frequent SPO triple in the normalcy pattern is greater than a preset value, determining the SPO extracted from the streaming data as an abnormal SPO triple.

7. The method according to claim 1, wherein the method further comprises:
in response to receiving an input document, extracting a plurality of entities, a plurality of relations, and a plurality of SPO triples from the input document to determine whether there is an abnormal word, thereby detecting an abnormal entity, relation, or SPO triple in the input document.

8. The method according to claim 1, wherein:
the SRL model is a link prediction algorithm RESCAL.

9. The method according to claim 1, wherein:
the message bus is Apache Kafka™.

10. The method according to claim 1, wherein:
the open-source distributed data management system is Cassandra™; and
the JavaScript library is D3.js.

11. A system for pattern discovery and real-time anomaly detection based on knowledge graph, comprising:

one or more processors; and
a memory storing a plurality of instructions,
wherein when executed by the one or more processors, the plurality of instructions perform a method of:
based on a dataset including messages collected within a certain period, constructing a local knowledge graph (KG), wherein the local KG includes a plurality of nodes for denoting a plurality of entities and a plurality of edges for denoting a plurality of relations, an entity is a subject or an object, and a relation is a predicate that couples a subject to an object to form a subject-predicate-object (SPO) triple;
applying a statistical relational learning (SRL) model to predict hidden relations between entities to obtain an updated local KG;
from all SPO triples of the updated local KG, discovering a normalcy pattern that includes frequent entities, frequent relations, and frequent SPO triples; and
in response to receiving streaming data from a message bus, extracting a plurality of entities, a plurality of relations, and a plurality of SPO triples, from the streaming data for comparison with the normalcy pattern, thereby determining whether there is an abnormal entity, relation, or SPO triple in the streaming data,
wherein the updated local KG is stored in an open-source distributed data management system and is visualized using a JavaScript library through a web browser.

12. The system according to claim 11, wherein the based on a dataset including messages collected within a certain period, constructing a local knowledge graph further comprises:
extracting the plurality of entities from the messages through a Named-Entity Recognition (NER) approach; and
extracting a plurality of SPO triples from sentences of the messages through an Open Information Extraction (Open IE) package, to obtain the plurality of relations.

13. The system according to claim 12, wherein the extracting a plurality of SPO triples from sentences of the messages through an Open Information Extraction (Open IE) package, to obtain the plurality of relations further comprises:
for a plurality of extracted SPO triples that are similar to each other, identifying a most concise SPO triple using part-of-speech (POS) tags, such that among the plurality of SPO triples that are similar to each other, the most concise SPO triple is retained and other SPO triples are removed.

14. The system according to claim 13, wherein the method further comprises:
for different entity names referring to a same entity in the local KG, mapping the different entity names to an openly available large KG to select a desired entity name or a unique identity identifier for representation in the local KG.

15. The system according to claim 11, wherein the from all SPO triples of the updated local KG, discovering a normalcy pattern that includes frequent entities, frequent relations, and frequent SPO triples further includes:
applying an Apriori algorithm to identify and extract the frequent entities, the frequent relations, and the frequent SPOs.

16. The system according to claim 11, wherein the in response to receiving streaming data from a message bus, extracting a plurality of entities, a plurality of relations, and a plurality of SPO triples, from the streaming data for comparison with the normalcy pattern, thereby determining whether there is an abnormal entity, relation, or SPO triple in the streaming data further comprises:
- when a semantic distance between an entity extracted from the streaming data and a frequent entity in the normalcy pattern is greater than a preset value, determining the entity extracted from the streaming data as an abnormal entity;
- when a semantic distance between a relation extracted from the streaming data and a frequent relation in the normalcy pattern is greater than a preset value, determining the relation extracted from the streaming data as an abnormal relation; and
- when a semantic distance between a SPO triple extracted from the streaming data and a frequent SPO triple in the normalcy pattern is greater than a preset value, determining the SPO extracted from the streaming data as an abnormal SPO triple.

17. The system according to claim 11, wherein the method further comprises:
- in response to receiving an input document, extracting a plurality of entities, a plurality of relations, and a plurality of SPO triples from the input document to determine whether there is an abnormal word, thereby detecting an abnormal entity, relation, or SPO triple in the input document.

18. The system according to claim 11, wherein:

the SRL model is a link prediction algorithm RESCAL.

19. The system according to claim 11, wherein:

the message bus is Apache Kafka™.

20. The system according to claim 11, wherein:

the open-source distributed data management system is Cassandra™; and the JavaScript library is D3.js.

* * * * *